US012468249B2

(12) United States Patent
Okada et al.

(10) Patent No.: US 12,468,249 B2
(45) Date of Patent: Nov. 11, 2025

(54) TWO-COMPONENT DEVELOPING TYPE IMAGE FORMING APPARATUS PROVIDED WITH AN IMAGE CARRYING MEMBER HAVING AN ORGANIC PHOTOSENSITIVE LAYER

(71) Applicant: KYOCERA Document Solutions Inc., Osaka (JP)

(72) Inventors: Masataka Okada, Osaka (JP); Kiyotaka Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/783,654

(22) Filed: Jul. 25, 2024

(65) Prior Publication Data

US 2025/0044729 A1 Feb. 6, 2025

(30) Foreign Application Priority Data

Aug. 1, 2023 (JP) ................................. 2023-125652

(51) Int. Cl.
*G03G 15/00* (2006.01)
*G03G 15/06* (2006.01)

(52) U.S. Cl.
CPC ....... *G03G 15/5004* (2013.01); *G03G 15/065* (2013.01); *G03G 15/5008* (2013.01); *G03G 15/757* (2013.01); *G03G 15/80* (2013.01)

(58) Field of Classification Search
CPC ............. G03G 15/5004; G03G 15/065; G03G 15/5008; G03G 15/757; G03G 15/80
See application file for complete search history.

(56) References Cited

U.S. PATENT DOCUMENTS

| | | | | |
|---|---|---|---|---|
| 2002/0018672 | A1* | 2/2002 | Ozawa | G03G 15/065 399/272 |
| 2008/0132368 | A1 | 6/2008 | Wu | 474/213 |
| 2010/0190598 | A1 | 7/2010 | Wu | 474/212 |
| 2016/0231664 | A1* | 8/2016 | Kubo | G03G 15/0266 |
| 2021/0286276 | A1* | 9/2021 | Makie | G03G 15/065 |

FOREIGN PATENT DOCUMENTS

| | | |
|---|---|---|
| JP | 2008-138881 A | 6/2008 |

* cited by examiner

*Primary Examiner* — Sandra Brase
(74) *Attorney, Agent, or Firm* — Stein IP, LLC

(57) ABSTRACT

An image forming apparatus includes: an image carrying member; a charging device; an exposure device; a developing device; a drive unit; a developing-voltage power supply; and a control unit. The developing device has a developer carrying member which is configured to carry a two-component developer containing a toner and a carrier. The developing-voltage power supply is configured to apply a developing voltage to the developer carrying member, the developing voltage being generated by superimposition of an AC voltage onto a DC voltage. The image forming apparatus has a first print mode in which an image carrying member is driven and rotated by a drive unit at a linear speed of 250 [mm/sec] or more. The image carrying member has a single organic-photosensitive layer as a photosensitive layer. The photosensitive layer has a layer thickness of 40 [μm] or more at start of use.

3 Claims, 5 Drawing Sheets

TWO-COMPONENT DEVELOPING TYPE IMAGE FORMING APPARATUS PROVIDED WITH AN IMAGE CARRYING MEMBER HAVING AN ORGANIC PHOTOSENSITIVE LAYER

INCORPORATION BY REFERENCE

This application is based on and claims the benefit of priority from Japanese Patent Application No. 2023-125652 filed on Aug. 1, 2023, the contents of which are hereby incorporated by reference.

BACKGROUND

The present disclosure relates to an image forming apparatus including an image carrying member, such as a copying machine, a printer, a facsimile machine, or a multifunction peripheral that has functions of these machines. More specifically, the present disclosure relates to an image forming apparatus including a developing device of a two-component developing type using a two-component developer.

In the image forming apparatus, an electrostatic latent image formed on the image carrying member such as a photosensitive member is developed by the developing device into a visible toner image. As such a developing device, for example, a developing device of a two-component developing type using a two-component developer has been employed.

When the image forming apparatus operates at a high processing-linear speed and is of the two-component developing type, in order to suppress movement of a carrier from the developing device to the photosensitive member (carrier development), an electric field on the photosensitive member is preferably weak. Specifically, an organic photosensitive member (OPC) is preferred to an amorphous-silicon (a-Si) photosensitive member, and a single organic-photosensitive layer of the organic photosensitive member is preferred to a laminate of the organic photosensitive layers.

Meanwhile, from a viewpoint of extending a lifespan of the image forming apparatus, it is necessary to use the photosensitive drum having a photosensitive layer with a large layer thickness that is equal to or larger than a certain thickness at start of use. However, when the image forming apparatus that operates at the high processing-linear speed and that is of the two-component developing type uses the organic photosensitive member with the large layer thickness, a tolerance in settings of (operation window of) a surface potential of the photosensitive member and a DC voltage of a developing voltage is small. As a result, image problems such as discharge unevenness and a drum ghost are liable to occur.

SUMMARY

According to an aspect of the present disclosure, there is provided an image forming apparatus including: an image carrying member; a charging device; an exposure device; a developing device; a drive unit; a developing-voltage power supply; and a control unit.

The image carrying member has a surface on which a photosensitive layer is formed.

The charging device is configured to charge the surface of the image carrying member.

The exposure device is configured to expose the surface of the image carrying member, the surface having been charged by the charging device, thereby forming an electrostatic latent image that is attenuated in charge.

The developing device has a developer carrying member which is configured to carry a two-component developer containing a toner and a carrier, and is configured to supply the toner in the two-component developer carried by the developer carrying member to the image carrying member, and to develop the electrostatic latent image into a toner image.

The drive unit is configured to drive and rotate the image carrying member at a predetermined linear speed.

The developing-voltage power supply is configured to apply a developing voltage to the developer carrying member, the developing voltage being generated by superimposition of an AC voltage onto a DC voltage.

The control unit is configured to control the drive unit and the developing-voltage power supply.

The image forming apparatus has a first print mode in which the image carrying member is driven and rotated by the drive unit at a linear speed of 250 [mm/sec] or more.

The image carrying member has a single organic-photosensitive layer as the photosensitive layer.

The photosensitive layer has a layer thickness of 40 [μm] or more at start of use.

DETAILED DESCRIPTION

Figure 1:
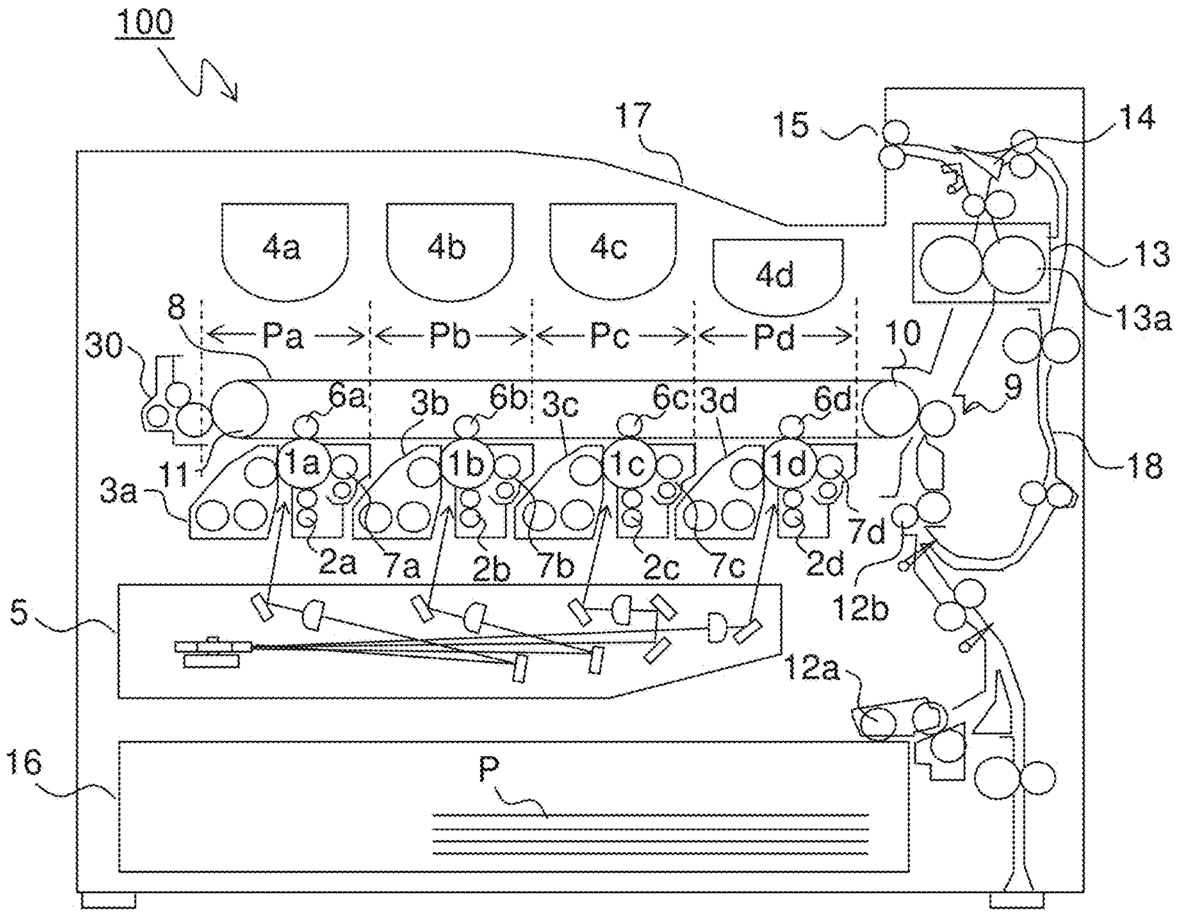
FIG. 1 is a schematic configuration view of a color printer according to an embodiment of the present disclosure.
Figure 2:
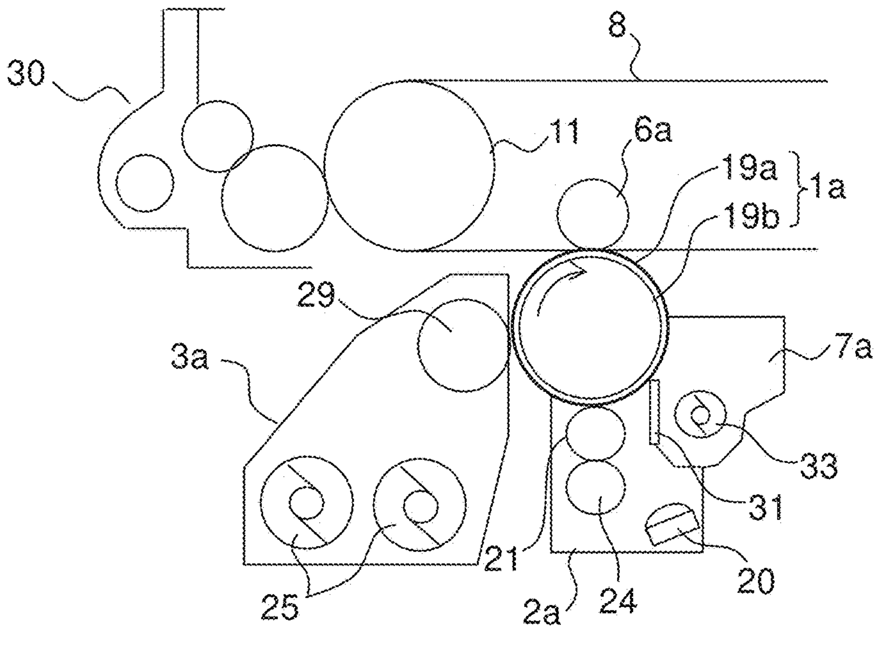
FIG. 2 is an enlarged view of a vicinity of an image forming section illustrated in FIG. 1.

In the following, an embodiment of the present disclosure is described with reference to the drawings. FIG. 1 is a schematic configuration view of a color printer 100 according to the embodiment of the present disclosure. FIG. 2 is an enlarged view of a vicinity of an image forming section Pa illustrated in FIG. 1. Note that, image forming sections Pb, Pc, and Pd also have basically the same configuration, and hence description thereof is omitted.

In a main body of the color printer 100, the four image forming sections Pa, Pb, Pc, and Pd are disposed sequentially from an upstream side in a conveying direction (left-hand side in FIG. 1). These image forming sections Pa to Pd are provided to correspond to images of four different colors (yellow, magenta, cyan, and black), and each perform steps of charging, exposure, development, and transfer. With this, images of yellow, magenta, cyan, and black are sequentially formed.

Photosensitive drums 1*a*, 1*b*, 1*c*, and 1*d* that carry visible images corresponding to the colors (toner images) are disposed respectively in these image forming sections Pa to Pd. In addition, an intermediate transfer belt 8 that is rotated in a counterclockwise direction in FIG. 1 is provided adjacent to the image forming sections Pa to Pd. The intermediate transfer belt 8 is stretched around a drive roller 10 on a downstream side and a tension roller 11 on the upstream side. A belt cleaning device 30 that faces the tension roller 11 with the intermediate transfer belt 8 sandwiched therebetween is arranged on an upstream side relative to the image forming section Pa in a direction of the rotation of the intermediate transfer belt 8.

As illustrated in FIG. 2, around the photosensitive drum 1*a*, a charging device 2*a*, a developing device 3*a*, a cleaning device 7*a*, and a static-elimination device 20 are disposed along a drum rotation direction (clockwise direction in FIG. 2), and a primary transfer roller 6*a* is arranged with the intermediate transfer belt 8 sandwiched between the primary transfer roller 6*a* and these devices.

The photosensitive drums 1*a* to 1*d* are each constituted by a conductive base 19*a* and a photosensitive layer 19*b* that is formed on a surface of the conductive base 19*a*. In this embodiment, a single organic-photosensitive layer is laminated as the photosensitive layer 19*b* on the surface of the conductive base 19*a* that is made of aluminum and formed into a cylindrical shape.

The charging device 2*a* and charging devices 2*b*, 2*c*, and 2*d* each include a charging roller 21 that applies a charging voltage (DC voltage+AC voltage) to the drum surface while in contact with a corresponding one of the photosensitive drums 1*a* to 1*d*, and a charging cleaning roller 24 for cleaning the charging roller 21.

The developing devices 3*a* and developing devices 3*b*, 3*c*, and 3*d* are each of a two-component developing type including two stirring-and-conveying screws 25 and a developing roller 29. A two-component developer containing a corresponding one of toners of the colors of yellow, magenta, cyan, and black and a magnetic carrier is charged by a predetermined amount in a corresponding one of the developing devices 3*a* to 3*d*. Magnetic brushes are formed on a surface of the developing roller 29 by using the two-component developer, and a developing voltage having the same polarity as that of the toner (positive polarity in this embodiment) is applied to the developing roller 29. In this state, the magnetic brushes are brought into contact with the surface of the photosensitive drums 1*a* to 1*d* to cause the toner to adhere to this surface. In this way, the toner image is formed. Note that, once a percentage of the toner in the two-component developer charged in a corresponding one of the developing devices 3*a* to 3*d* has fallen below a preset value as a result of the formation of the toner image, the toner is replenished from a corresponding one of toner containers 4*a*, 4*b*, 4*c*, and 4*d* to the corresponding one of the developing devices 3*a* to 3*d*.

The cleaning device 7*a* and cleaning devices 7*b*, 7*c*, and 7*d* each include a cleaning blade 31 and a recovery screw 33. The cleaning blade 31 removes residual toner and the like on a corresponding one of the surfaces of the photosensitive drums 1*a* to 1*d*. The recovery screw 33 discharges the toner and the like removed by the cleaning blade 31 to an outside of a corresponding one of the cleaning devices 7*a* to 7*d*, and recovers the toner and the like into a waste-toner recovery container (not shown). The static-elimination device 20 removes residual charges by radiating static-elimination light to the surfaces of a corresponding one of the photosensitive drums 1*a* to 1*d*.

In response to an input of image data from a host apparatus such as a personal computer, first, a main motor 40 (refer to FIG. 3) starts to rotate the photosensitive drums 1*a* to 1*d*. In addition, a belt drive motor 41 (refer to FIG. 3) starts to drive and rotate the intermediate transfer belt 8. Then, the charging devices 2*a* to 2*d* uniformly charge the surfaces of the photosensitive drums 1*a* to 1*d* with the same polarity as that of the toners (positive polarity in this embodiment). Next, an exposure device 5 radiates light in accordance with the image data to form electrostatic latent images that are attenuated in charge in accordance with the image data on the photosensitive drums 1*a* to 1*d*.

The predetermined amounts of the two-component developers (hereinafter, also simply referred to as developers) each containing a corresponding one of the toners of the colors of yellow, magenta, cyan, and black have been charged from the toner containers 4*a* to 4*d* to the developing devices 3*a* to 3*d*. The developing devices 3*a* to 3*d* supply the toners contained in the developers onto the photosensitive drums 1*a* to 1*d*, and the toners electrostatically adhere to the photosensitive drums 1*a* to 1*d*. In this way, the toner images are formed in accordance with the electrostatic latent images formed by the exposure from the exposure device 5.

Then, the primary transfer roller 6*a* and primary transfer rollers 6*b*, 6*c*, and 6*d* apply an electric field with a predetermined transfer voltage between the primary transfer rollers 6*a* to 6*d* and the photosensitive drums 1*a* to 1*d*. With this, the toner images of yellow, magenta, cyan, and black on the photosensitive drums 1*a* to 1*d* are primarily transferred onto the intermediate transfer belt 8. The residual toner and the like on the surfaces of the photosensitive drums 1*a* to 1*d* after the primary transfer are removed by the cleaning devices 7*a* to 7*d*. The residual charge on the surface of a corresponding one of the photosensitive drums 1*a* to 1*d* after the primary transfer is removed by the static-elimination device 20.

Transfer paper P onto which the toner images are transferred is stored in a paper cassette 16 that is arranged on a lower side in the color printer 100. The transfer paper P is conveyed, by a paper-feeding roller 12*a* and a registration roller pair 12*b* and at a predetermined timing, to a nip portion (secondary-transfer nip portion) between the intermediate transfer belt 8 and a secondary transfer roller 9 that is provided adjacent to the intermediate transfer belt 8. The transfer paper P to which the toner images have been secondarily transferred are conveyed to a fixing section 13.

The transfer paper P that has been transferred to the fixing section 13 is heated and pressed by a fixing roller pair 13*a*. With this, the toner images are fixed to surfaces of the transfer paper P. In this way, a predetermined full-color image is formed. The transfer paper P on which the full-color image has been formed is discharged onto a discharge tray 17 by a discharge roller pair 15 as normal (or after the transfer paper P has been routed to a reverse conveying path 18 by a branch section 14, and images have been formed on both sides of the transfer paper P).

Figure 3:
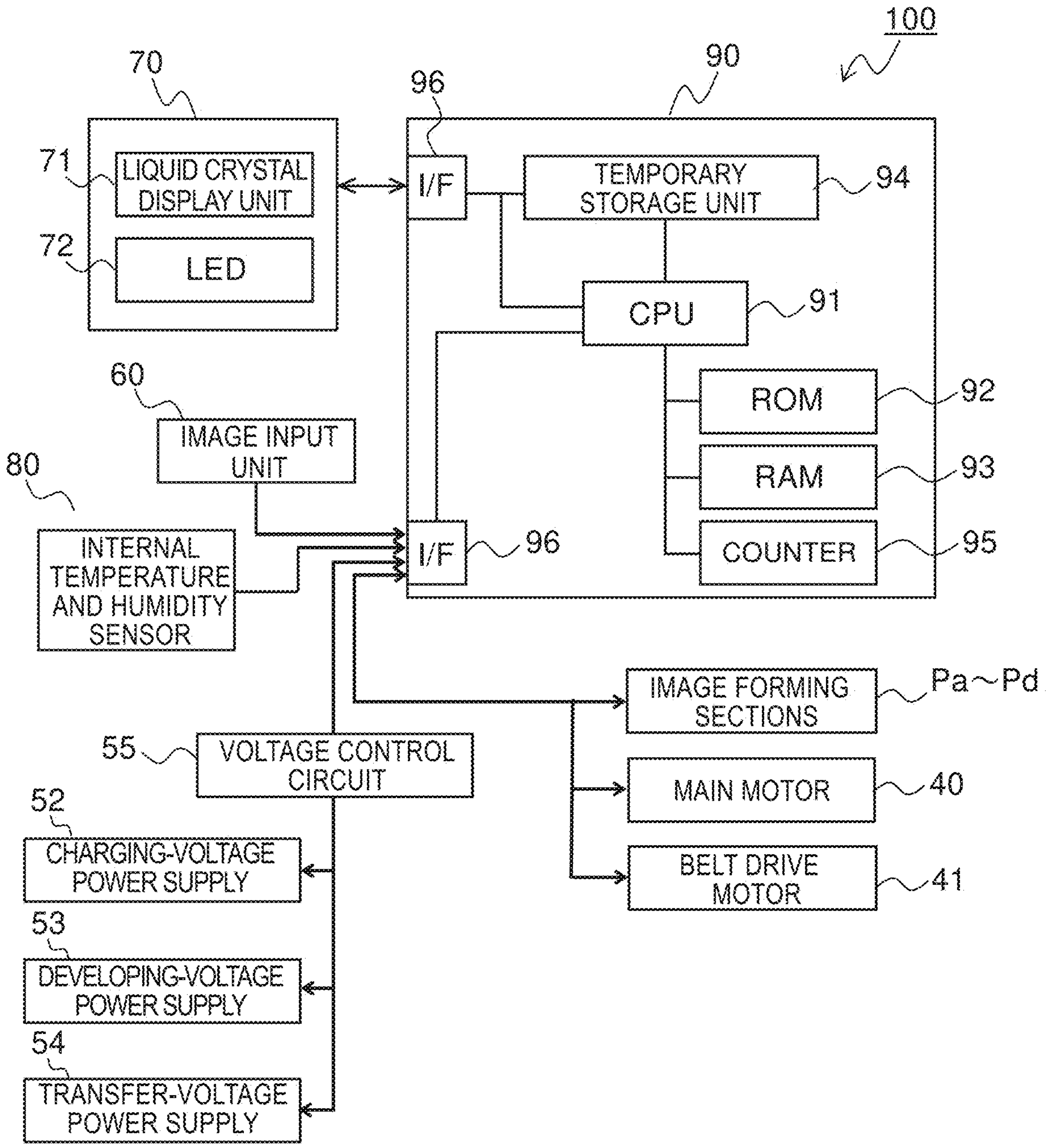
FIG. 3 is a block diagram showing an example of a control system to be used for the color printer.

FIG. 3 is a block diagram showing an example of a control system to be used for the color printer 100. Note that, in using the color printer 100, components of the color printer 100 are variously controlled, and hence the control system for an entirety of the color printer 100 is complicated. In view of such circumstances, herein, parts that are necessary for carrying out the present disclosure among parts of the control system are mainly described.

A charging-voltage power supply 52 applies a charging voltage to the charging roller 21 in each of the charging devices 2*a* to 2*d*. A developing-voltage power supply 53 applies a developing voltage that is generated by superimposition of an AC voltage Vac onto a DC voltage Vdc to the developing roller 29 in each of the developing devices 3*a* to 3*d*. A transfer-voltage power supply 54 applies a predetermined primary-transfer voltage and a predetermined secondary-transfer voltage respectively to the primary transfer rollers 6*a* to 6*d* and the secondary transfer roller 9. A voltage control circuit 55 is connected to the charging-voltage power supply 52, the developing-voltage power supply 53, and the transfer-voltage power supply 54, and activates these power supplies in response to output signals from a control unit 90.

An image input unit 60 is a receiving unit that receives the image data to be transmitted from the personal computer or the like to the color printer 100. An image signal input via the image input unit 60 is converted to a digital signal, and then transmitted to a temporary storage unit 94.

An operation unit 70 includes a liquid-crystal display unit 71 and an LED 72. The liquid-crystal display unit 71 displays, for example, an operating status of the color printer 100, a status of image formation, and the number of printed copies. The LED 72 indicates, for example, various statuses of and errors in the color printer 100. Various settings for the color printer 100 are configured through a printer driver on the personal computer.

In addition, the operation unit 70 includes a start button that a user presses to issue an instruction to start the image formation, a stop/clear button which is used, for example, to stop the image formation, and a reset button which is used to default the various settings for the color printer 100.

An internal temperature-and-humidity sensor 80 detects a temperature and humidity in the color printer 100, specifically, detects a temperature and humidity around the image forming sections Pa to Pd, and are arranged in a vicinity of the image forming sections Pa to Pd.

The control unit 90 includes at least a CPU (Central Processing Unit) 91 as a central arithmetic-processing device, a ROM (Read Only Memory) 92 being a read-only storage unit, a RAM (Random Access Memory) 93 being a readable-and-writable storage unit, the temporary storage unit 94 that temporarily stores the image data and the like, a counter 95, and a plurality of (two in this embodiment) I/Fs (interfaces) 96 that transmit control signals to the devices in the color printer 100 and receives input signals from the operation unit 70. The control unit 90 can be arranged at an arbitrary position in the main body of the color printer 100.

The ROM 92 stores, for example, such data that is not changed during use of the color printer 100, specifically, programs for controlling the color printer 100 and numerical values that are necessary for the control. The RAM 93 stores, for example, necessary data that is generated during the control of the color printer 100, and data that is temporarily necessary for the control of the color printer 100. The temporary storage unit 94 temporarily stores the image signal that is input via the image input unit 60 and converted to the digital signal. The counter 95 tallies up the number of printed sheets.

Further, the control unit 90 transmits the control signals from the CPU 91 to the components and the devices in the color printer 100 via the I/Fs 96. Still further, signals that indicate statuses of the components and the devices and the input signals from these components and devices are transmitted to the CPU 91 via the I/Fs 96. Examples of the components and the devices that the control unit 90 controls include the image forming sections Pa to Pd, the exposure device 5, the intermediate transfer belt 8, the secondary transfer roller 9, the fixing section 13, the voltage control circuit 55, the image input unit 60, the operation unit 70, and the internal temperature-and-humidity sensor 80.

When the color printer 100 operates at a high processing-linear speed (250 [mm/sec] or more) and is of the two-component developing type, in order to suppress carrier development, an electric field between the developing roller 29 and each of the photosensitive drums 1*a* to 1*d* is preferably weak. Note that, the processing linear speed is a processing speed of printing in the color printer 100 (speed of conveying the transfer paper P), which is the same as a rotational speed of each of the photosensitive drums 1*a* to 1*d*.

For example, a relative permittivity $\varepsilon$ of an amorphous-silicon (a-Si) photosensitive layer is $\varepsilon=10$, and a relative permittivity $\varepsilon$ of an organic photosensitive layer (OPC) is $\varepsilon=3$. Thus, in the color printer 100 that operates at the high processing-linear speed and that is of the two-component developing type, the organic photosensitive layer is advantageous over the a-Si photosensitive layer.

Figure 4:
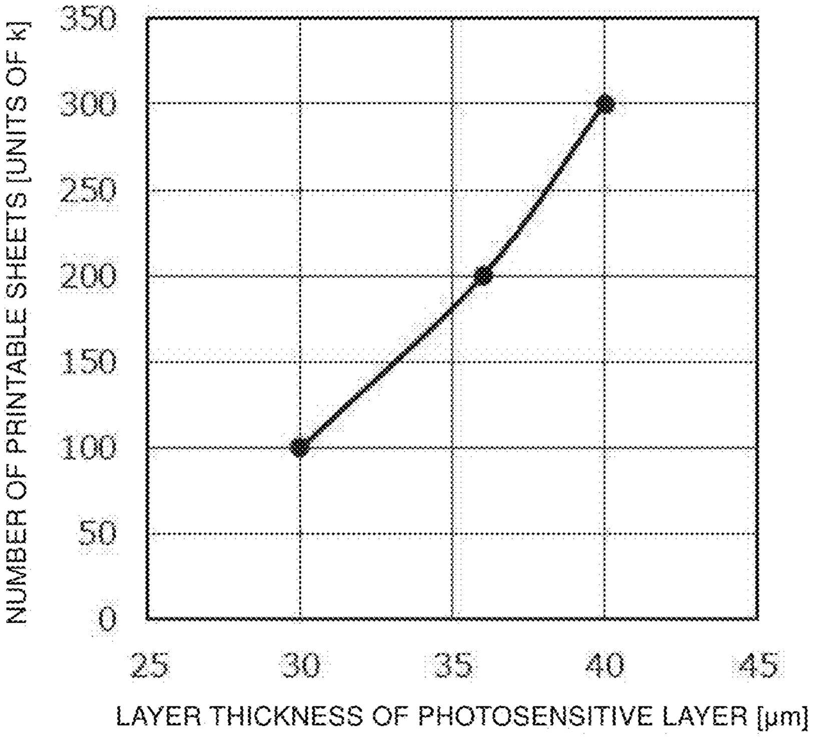
FIG. 4 is a graph showing a relationship between a layer thickness of a photosensitive layer of a photosensitive drum and the number of printable sheets in a case where the photosensitive layer is a single organic-photosensitive layer.

FIG. 4 is a graph showing a relationship between a layer thickness of the photosensitive layer 19*b* of each of the photosensitive drums 1*a* to 1*d* and the number of printable sheets (a lifespan) in a case where the photosensitive layer 19*b* is the single organic-photosensitive layer. As shown in FIG. 4, in the case where the photosensitive layer 19*b* is the single organic-photosensitive layer, in order to extend the lifespan to such an extent that 300k or more sheets can be printed, it is necessary to set the layer thickness of the photosensitive layer 19*b* to 40 [μm] or more.

Figure 5:
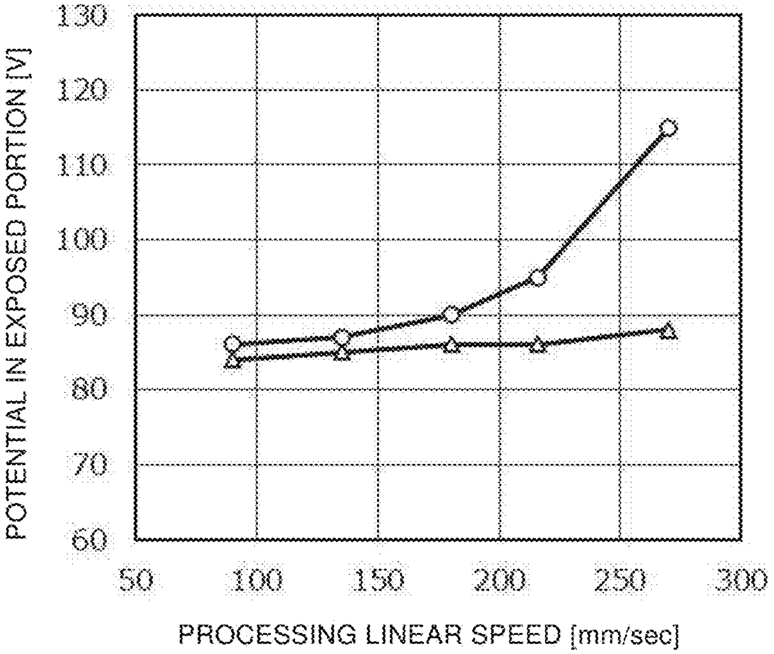
FIG. 5 is a graph showing relationships between a processing linear speed and a high-speed responsivity in the color printer that uses the organic photosensitive layer as the photosensitive layer and that is of a two-component developing type.

FIG. 5 is a graph showing relationships between the processing linear speed and a high-speed responsivity in the color printer 100 that uses the organic photosensitive layer as the photosensitive layer 19*b* and that is of the two-component developing type. The high-speed responsivity refers to a degree of a reduction in surface potential at a time when the photosensitive drums 1*a* to 1*d* charged with a predetermined surface potential are exposed by the exposure device 5. In FIG. 5, potentials in an exposed portion (image portion) after the exposure by the exposure device 5 at different processing-linear speeds are compared with each other between a laminate of the organic photosensitive layers, the laminate having a layer thickness of 40 [μm] (data series ○ in the graph) and the single organic-photosensitive layer having the layer thickness of 40 [μm] (data series A in the graph). As understood from the comparison, the responsivity becomes better as the potential in the exposed portion becomes lower, and the responsivity becomes poorer as the potential in the exposed portion becomes higher.

As shown in FIG. 5, when the photosensitive layer 19*b* has the layer thickness of 40 [μm], a responsivity of the laminate of the organic photosensitive layers decreases especially in a region of the linear speed of 250 [mm/sec] or more. Thus, the single organic-photosensitive layer is advantageous. FIG. 5 demonstrates that, when the color printer 100 including the photosensitive drums 1*a* to 1*d* each operating at the processing linear speed of 250 [mm/sec] or more is of the two-component developing type, the single organic-photosensitive layer having the layer thickness of 40 [μm] or more is preferably used as the photosensitive layer 19*b*.

However, when the color printer 100 operates at the high processing-linear speed and is of the two-component developing type, by using the single organic-photosensitive layer having the layer thickness of 40 [μm] or more as the photosensitive layer 19*b* of each of the photosensitive drums 1*a* to 1*d*, image problems such as image unevenness and a drum ghost are liable to occur.

In view of such circumstances, in the color printer 100 of the two-component developing type according to this embodiment, at the time when the processing linear speed is set to 250 [mm/sec] or more, and when the single organic-photosensitive layer having the layer thickness of 40 [μm] or more is used as the photosensitive layer 19*b* of each of the photosensitive drums 1*a* to 1*d*, developing conditions are properly set to suppress the image problems as described above. In the following, settings for the developing conditions are described in detail.

[Settings for Developing Voltage Under Conditions of Different Processing-Linear Speeds]

Figure 6:
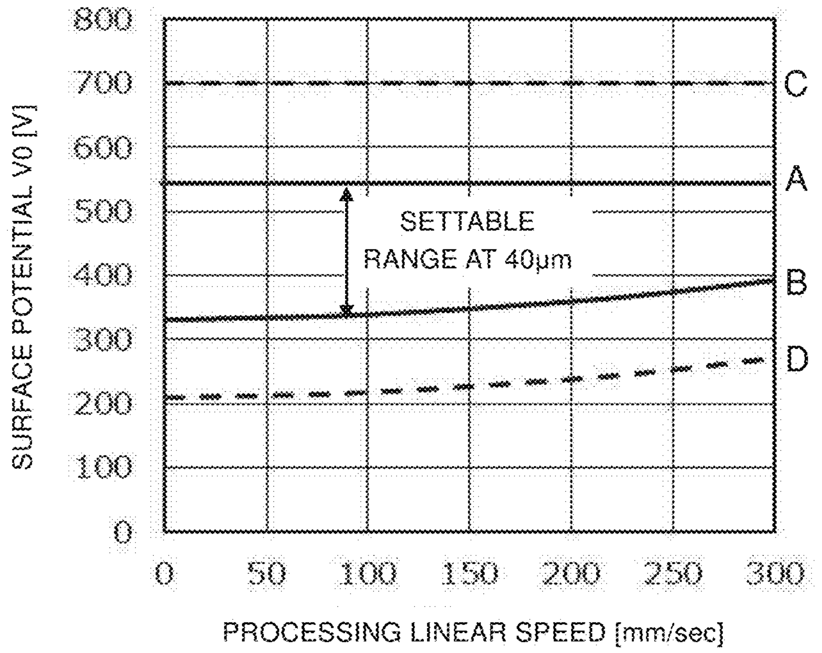
FIG. 6 is a graph showing relationships between the processing linear speed, a surface potential, and image problems in the color printer that uses the single organic-photosensitive layer as the photosensitive layer and that is of the two-component developing type.

FIG. 6 is a graph showing relationships between the processing linear speed, the surface potential, and the image problems in the color printer 100 that uses the single organic-photosensitive layer as the photosensitive layer 19*b* and that is of the two-component developing type. In FIG. 6, the abscissa axis represents the processing linear speed, the ordinate axis represents the surface potential V0 of each of the photosensitive drums 1*a* to 1*d*. FIG. 6 shows results of image rating in a case where two types of layer thicknesses, that is, the layer thickness of 40 [μm] and a layer thickness of 20 [μm] were used as the layer thickness of the photosensitive layer 19*b*. In FIG. 6, upper limit values and lower limit values of the surface potential V0 in the case where the layer thickness of 40 [μm] was used are indicated respectively by solid lines A and B, and upper limit values and lower limit values of the surface potential V0 in the case where the layer thickness of 20 [μm] was used are indicated respectively by dashed lines C and D.

As shown in FIG. 6, in regions where the surface potential V0 is high, the charging voltage that is high is applied to the photosensitive drums 1*a* to 1*d* to cause uneven image formation due to discharge unevenness. In addition, in the case where the photosensitive layer 19*b* has the layer thickness of 40 [μm], the charging voltage that is necessary for charging the photosensitive drums 1*a* to 1*d* with a desired surface potential V0 is higher than that in the case where the photosensitive layer 19*b* has the layer thickness of 20 [μm]. As a result, the discharge unevenness is more liable to occur. In other words, in the case where the layer thickness is 40 [μm], the upper limit values of the surface potential V0 are smaller than those in the case where the layer thickness is 20 [μm].

Meanwhile, regions where the surface potential V0 is low are liable to be affected by the electric field of the primary transfer onto the intermediate transfer belt 8 and unevenness of other potentials. As a result, the image unevenness and the drum ghost occur. In addition, in the case where the photosensitive layer 19*b* has the layer thickness of 40 [μm], an opposite charge that is injected at the time of the primary transfer is more difficult to neutralize than in the case where the photosensitive layer 19*b* has the layer thickness of 20 [μm]. As a result, the drum ghost is more liable to occur. In other words, in the case where the layer thickness is 40 [μm], the lower limit values of the surface potential V0 are larger than those in the case where the layer thickness is 20 [μm].

For reasons as described above, a settable range of the surface potential V0 (interval between the solid lines A and B) in the case of using the photosensitive drums 1*a* to 1*d* each having the photosensitive layer 19*b* with the large layer thickness (40 [μm]) is narrower than a settable range of the surface potential V0 (interval between the dashed lines C and D) in the case of using the photosensitive drums 1*a* to 1*d* each having the photosensitive layer 19*b* with the small layer thickness (20 [μm]).

Figure 7:
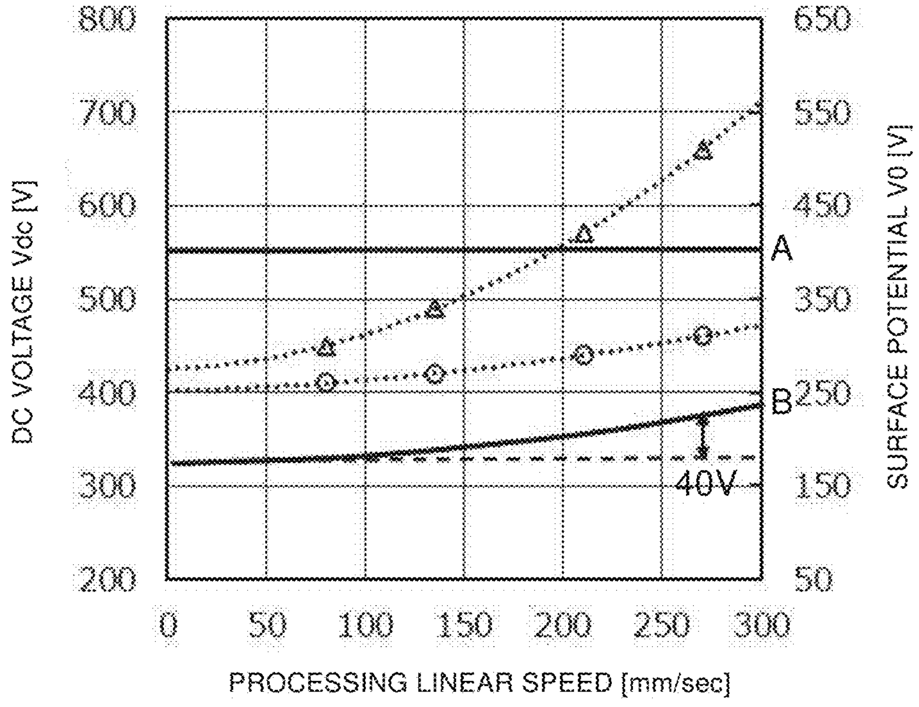
FIG. 7 is a graph showing relationships between the processing linear speed, the surface potential, a developing voltage, and the image problems in the color printer that uses the single organic-photosensitive layer as the photosensitive layer and that is of the two-component developing type.

FIG. 7 is a graph showing relationships between the processing linear speed, the surface potential, the developing voltage, and the image problems in the color printer 100 that uses the single organic-photosensitive layer as the photosensitive layer 19*b* and that is of the two-component developing type. In FIG. 7, the abscissa axis represents the processing linear speed, the ordinate axis on the left represents the developing voltage (DC voltage Vdc), and the ordinate axis on the right represents the surface potential V0. In the two-component developing type, in order to avoid image fogging and carrier development, it is necessary to maintain a difference V0−Vdc between the DC voltage Vdc and the surface potential V0 (difference in developing potential). In FIG. 7, the difference V0−Vdc is set to 150 [V].

FIG. 7 shows results of image rating in a case where two types of carriers with carrier resistances of $10^9$ [Ω·cm] and $10^{11}$ [Ω·cm] were used as carriers in the two-component developer. In FIG. 7, upper limit values at or below which the DC voltage Vdc did not cause the discharge unevenness are indicated by the solid line A, and lower limit values at or above which the DC voltage Vdc did not cause the drum ghost or the image unevenness are indicated by the solid line B.

As shown in FIG. 7, in the case where the carrier resistance is $10^9$ [Ω·cm] (data series ○ in the graph), even when the processing linear speed vary, a variation range of the developing voltage in consideration of adjustment of or variation in density by calibration falls within a region where the image problems do not occur (between the solid lines A and B).

Meanwhile, in the case of using the high-resistance carrier, developing performance decreases in a region where the processing linear speed is high. As a precaution, in order to secure the image density in the region where the processing linear speed is high, it is necessary to set the developing voltage to be high, and it is necessary also to set the surface potential V0 of each of the photosensitive drums 1*a* to 1*d* to be high in accordance with the developing voltage. As a result, in the case where the carrier resistance is $10^{11}$ [Ω·cm] (data series A in the graph), the region where the processing linear speed is high (200 [mm/sec] or more) is a region where the image problems occur (region above the solid line A).

In view of such circumstances, in the color printer 100 that uses the single organic-photosensitive layer as the photosensitive layer 19*b* and that is of the two-component developing type, the low-resistance carrier with the carrier resistance of, for example, $10^9$ [Ω·cm] is used. With this, the developing performance increases in the region where the processing linear speed is high, and a variation amount of the necessary developing voltage between the different processing-linear speeds can be reduced.

As described above, in the case of using the photosensitive drums 1*a* to 1*d* each having the photosensitive layer 19*b* with the layer thickness of, for example, 40 [μm], since the settable range of the surface potential V0 is narrow, it is necessary to reduce the difference in the developing voltage between the different processing-linear speeds by using the low-resistance carrier. Specifically, in the color printer 100 that is used in the rating shown in FIG. 6 and FIG. 7, specifically, that operates at the processing linear speed of 250 [mm/sec] or more, that uses the single organic-photosensitive layer having the layer thickness of 40 [μm] or more as the photosensitive layer 19*b*, and that is of the two-component developing type, in order to maintain image quality, it is necessary that a variation amount of the developing voltage at a time when a difference in the processing linear speed is 180 [mm/sec] be reduced to 40 [V] or less.

In order to suppress the variation amount, for example, a two-component developer containing a carrier with a carrier resistance of $10^9$ [Ω·cm] or less is used. With this, a variation amount of the developing voltage between a case where the photosensitive drums 1*a* to 1*d* each having the single organic-photosensitive layer with the layer thickness of 40 [μm] at start of use are used in a print mode (first print mode) with a processing linear speed of 270 [mm/sec] and a case where the photosensitive drums 1*a* to 1*d* are used in a print mode (second print mode) with a processing linear speed of 90 [mm/sec] (the difference in the processing linear speed is 180 [mm/sec]) can be suppressed to 40 [V] or less.

Note that, the variation amount of the developing voltage at the time when the difference in the processing linear speed is 180 [mm/sec] need not necessarily be suppressed to 40 [V] or less in consideration of the adjustment of or the variation in density by the calibration as in the example shown in FIG. 7. This is because, as long as, for example, a variation in the surface potential V0 of each of the photosensitive drums 1*a* to 1*d* can be suppressed, there is no risk that the image problems such as the discharge unevenness and the drum ghost occur. Thus, the variation amount of the developing voltage need not necessarily be suppressed to 40 [V] or less.

[Settings for Developing Frequency for Suppressing Drum Ghost]

Figure 8:
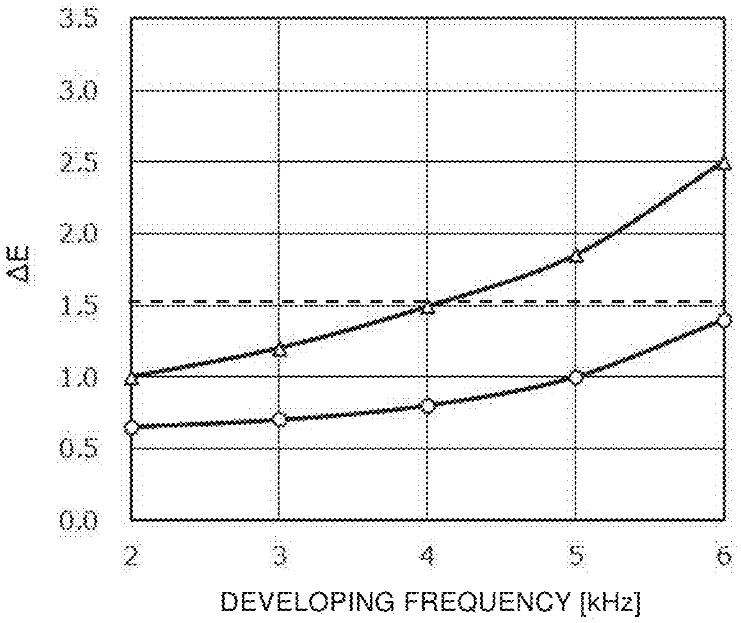
FIG. 8 is a graph showing relationships between a developing frequency and a drum ghost in the color printer that uses the single organic-photosensitive layer as the photosensitive layer and that is of the two-component developing type.

FIG. 8 is a graph showing relationships between a developing frequency and the drum ghost in the color printer 100 that uses the single organic-photosensitive layer as the photosensitive layer 19*b* and that is of the two-component developing type. In FIG. 8, the abscissa axis represents a frequency of the AC voltage Vac of the developing voltage (hereinafter, referred to as the developing frequency), and the ordinate axis represents a color-tone difference ΔE of images. FIG. 8 shows results of image rating in a case where the two types of layer thicknesses, that is, the layer thicknesses of 40 [μm] and 20 [μm] were used as the layer thickness of the photosensitive layer 19*b* and where the processing linear speed was 270 [mm/sec]. In FIG. 8, the color-tone difference ΔE (=1.5) at which the drum ghost was visually recognized is indicated by a dashed line.

As shown in FIG. 8, in the case where the photosensitive layer 19*b* has the layer thickness of 40 [μm] (data series Δ in the graph), the color-tone difference ΔE is larger than that in the case where the photosensitive layer 19*b* has the layer thickness of 20 [μm] (data series ○ in the graph). This is because it becomes more difficult to charge the photosensitive layer 19*b* as the layer thickness of the photosensitive layer 19*b* becomes larger. In the case of using the photosensitive drums 1*a* to 1*d* each having the photosensitive layer 19*b* with the large layer thickness of, for example, 40 [μm], it is necessary to suppress the drum ghost.

In addition, as is clear from FIG. 8, the color-tone difference ΔE becomes larger as the developing frequency becomes higher. This is because there is a tendency that, as the developing frequency becomes higher, the toner is more easily moved from the developing roller 29 to each of the photosensitive drums 1*a* to 1*d* to enhance developing performance. The color-tone difference ΔE becomes higher as an image contrast becomes higher. FIG. 8 demonstrates that, in the case of using the single organic-photosensitive layer having the layer thickness of 40 [μm] in the print mode in which the processing linear speed is 270 [mm/sec], it is necessary to set the developing frequency to 4 [KHz] or less.

According to this embodiment, in the color printer 100 that uses the photosensitive drums 1*a* to 1*d* each having, as the photosensitive layer 19*b*, the single organic-photosensitive layer with the layer thickness of 40 [μm] or more at start of use, and that is of the two-component developing type, the developing conditions are optimized. With this, the processing linear speed is increased, lifespans of the photosensitive drums 1*a* to 1*d* are extended, and a settable range of the developing voltage and the settable range of the surface potential V0 (operation windows) can be secured. As a result, occurrence of the image problems is suppressed, and proper image quality can be maintained.

Specifically, in the two print modes with the difference therebetween of 180 [mm/sec] or more in the processing linear speed, the variation amount of the developing voltage (DC voltage Vdc) is suppressed to 40 [V] or less. With this, the DC voltage Vdc and the surface potential V0 can be set not to cause the discharge unevenness, the drum ghost, or the image unevenness. In order to suppress the variation amount of the developing voltage (DC voltage Vdc) to 40 [V] or less, for example, the two-component developer containing the carrier with the carrier resistance of $10^9$ [Ω·cm] or less is used.

In addition, by setting the developing frequency to 4 [KHz] or less, generation of the drum ghost in the print mode with the processing linear speed of 250 [mm/sec] or more can be suppressed. Note that, when the developing frequency is set to be low, although the generation of the drum ghost can be suppressed, the image fogging is liable to occur. As a precaution, in the print mode (second print mode) in which the processing linear speed is 90 [mm/sec] and in which generation of the drum ghost is prevented, the developing frequency is preferably set to be larger than 4 [kHz].

Note that, the present disclosure is not limited to the embodiment described hereinabove, and may be variously modified within the gist of the present disclosure. For example, the present disclosure is applicable not only to the color printer 100 of the intermediate transfer type in which the toner images formed on the photosensitive drums 1*a* to 1*d* are primarily transferred onto the intermediate transfer belt 8, and then secondarily transferred onto the transfer paper P as in the embodiment described hereinabove, but also to a color printer of a direct transfer type in which the toner images formed on the photosensitive drums 1*a* to 1*d* are transferred directly onto the transfer paper P.

In addition, the present disclosure is applicable not only to the color printer 100 of a tandem type that is described as an example of the image forming apparatus in the embodiment described hereinabove, but also to, as a matter of course, other image-forming apparatuses of the two-component developing type, such as a color copying machine, a color multifunction peripheral, a monochromatic printer, and a monochromatic multifunction peripheral.

The present disclosure is applicable to an image forming apparatus including developing devices of a two-component developing type. By application of the present disclosure, it is possible to enable an image forming apparatus that operates at a high processing-linear speed and uses a single organic-photosensitive member to extend a lifespan and to suppress image problems such as carrier development and a drum ghost.

What is claimed is:

1. An image forming apparatus, comprising:

an image carrying member that has a surface on which a photosensitive layer is formed;

a charging device that is configured to charge the surface of the image carrying member:

an exposure device that is configured to expose the surface of the image carrying member, the surface having been charged by the charging device, thereby forming an electrostatic latent image that is attenuated in charge:

a developing device that has a developer carrying member which is configured to carry a two-component developer containing a toner and a carrier, and that is configured to supply the toner in the two-component developer carried by the developer carrying member to the image carrying member, and to develop the electrostatic latent image into a toner image;

a drive unit that is configured to drive and rotate the image carrying member at a predetermined linear speed;

a developing-voltage power supply that is configured to apply a developing voltage to the developer carrying member, the developing voltage being generated by superimposition of an AC voltage onto a DC voltage; and a control unit that is configured to control the drive unit and the developing-voltage power supply, the image forming apparatus having a first print mode in which the image carrying member is driven and rotated by the drive unit at a linear speed of 250 [mm/sec] or more, the image carrying member having a single organic-photosensitive layer as the photosensitive layer, the photosensitive layer having a layer thickness of 40 [μm] or more at start of use, wherein the control unit is switchable to a plurality of print modes including the first print mode and a second print mode in which a linear speed is lower than the linear speed in the first print mode, and in which a difference of the linear speed from the linear speed in the first print mode is 180 [mm/sec] or more, and wherein a variation amount of the DC voltage of the developing voltage between the first print mode and the second print mode is 40 [V] or less.

2. The image forming apparatus according to claim 1, wherein the carrier in the two-component developer has a resistance of 109 [Ω·cm] or less.

3. The image forming apparatus according to claim 1, wherein the AC voltage that is used in the first print mode has a frequency of 4 [KHz] or less.

* * * * *